US010406501B2

(12) United States Patent
Liang

(10) Patent No.: US 10,406,501 B2
(45) Date of Patent: Sep. 10, 2019

(54) ELECTROCHEMICAL REMOVAL OF METAL OR OTHER MATERIAL FROM POLYCRYSTALLINE DIAMOND

(71) Applicant: Halliburton Energy Services, Inc., Houston, TX (US)

(72) Inventor: Qi Liang, Richmond, VA (US)

(73) Assignee: Halliburton Energy Services, Inc., Houston, TX (US)

( * ) Notice: Subject to any disclaimer, the term of this patent is extended or adjusted under 35 U.S.C. 154(b) by 9 days.

(21) Appl. No.: 15/571,285

(22) PCT Filed: Jun. 3, 2015

(86) PCT No.: PCT/US2015/034005
§ 371 (c)(1),
(2) Date: Nov. 2, 2017

(87) PCT Pub. No.: WO2016/195678
PCT Pub. Date: Dec. 8, 2016

(65) Prior Publication Data

US 2018/0111107 A1 Apr. 26, 2018

(51) Int. Cl.

*C25B 1/00* (2006.01)
*B01J 19/08* (2006.01)
*C01B 32/28* (2017.01)

(52) U.S. Cl.

CPC ............ *B01J 19/087* (2013.01); *C01B 32/28* (2017.08); *C25B 1/00* (2013.01); *B01J 2219/0803* (2013.01); *B01J 2219/0879* (2013.01); *C01P 2002/52* (2013.01); *C01P 2006/80* (2013.01)

(58) Field of Classification Search

None
See application file for complete search history.

(56) References Cited

U.S. PATENT DOCUMENTS

| | | | |
|---|---|---|---|
| 6,322,891 | B1 | 11/2001 | Meng et al. |
| 6,846,341 | B2 | 1/2005 | Middlemiss |
| 8,043,533 | B2 | 10/2011 | Tajima et al. |
| 8,414,986 | B2 | 4/2013 | Keshavan |
| 8,435,324 | B2 | 5/2013 | Ladi et al. |
| 8,535,400 | B2 | 9/2013 | Belnap et al. |
| 2007/0169419 | A1 | 7/2007 | Davis et al. |
| 2007/0187465 | A1 | 8/2007 | Eyre et al. |

(Continued)

FOREIGN PATENT DOCUMENTS

| | | |
|---|---|---|
| CN | 102059341 | 5/2011 |
| CN | 103603026 | 2/2014 |

(Continued)

OTHER PUBLICATIONS

Ristein, J., et al. "Surface doping: a special feature of diamond." Journal of Physics: Condensed Matter 13.40 (2001): 8979; 9 pages.

(Continued)

*Primary Examiner* — Arun S Phasge
(74) *Attorney, Agent, or Firm* — Baker Botts L.L.P.

(57) ABSTRACT

The present disclosure relates to systems and methods for electrochemical metal or other positive ion removal from polycrystalline diamond (PCD), such as PCD used in earth-boring drill bits. PCD used in the systems and methods described herein has an electrical conductivity-enhanced region.

19 Claims, 4 Drawing Sheets

100
130
140
140
230
110
210
220
120
150

(56) References Cited

U.S. PATENT DOCUMENTS

| | | | | |
|---|---|---|---|---|
| 2010/0011907 | A1 | 1/2010 | Seed et al. | |
| 2010/0095602 | A1 | 4/2010 | Belnap et al. | |
| 2011/0030283 | A1 | 2/2011 | Cariveau et al. | |
| 2011/0315456 | A1 | 12/2011 | Lyons | |
| 2012/0047815 | A1 | 3/2012 | Sani | |
| 2012/0061149 | A1 | 3/2012 | Liversage et al. | |
| 2013/0001100 | A1 | 1/2013 | Thigpen et al. | |
| 2013/0214768 | A1 | 8/2013 | Chintamaneni et al. | |
| 2013/0214799 | A1 | 8/2013 | Bellin et al. | |
| 2013/0247478 | A1 | 9/2013 | Bellin et al. | |
| 2013/0248258 | A1 | 9/2013 | Bellin et al. | |
| 2013/0291447 | A1* | 11/2013 | Mazyar .................... | B24D 3/10<br>51/309 |

FOREIGN PATENT DOCUMENTS

| | | |
|---|---|---|
| CN | 104046785 | 9/2014 |
| CN | 104047022 | 9/2014 |
| CN | 104195591 | 12/2014 |
| CN | 104389012 | 3/2015 |
| EP | 1958688 | 8/2008 |
| JP | 2012/097334 | 5/2012 |
| WO | 2010/084447 | 7/2010 |
| WO | 2013/166398 | 11/2013 |
| WO | 2014/020021 | 2/2014 |
| WO | 2014/033168 | 3/2014 |

OTHER PUBLICATIONS

Jiang, Nan, and Toshimichi Ito. "Electrical properties of surface conductive layers of homoepitaxial diamond films " Journal of applied physics 85.12 (1999): 8267-8273; 7 pages.

Seshan, V., et al. "Hydrogen termination of CVD diamond films by high-temperature annealing at atmospheric pressure." The Journal of chemical physics 138.23 (2013): 234707; 6 pages.

International Search Report and Written Opinion for PCT Patent Application No. PCT/US2015/034005, dated Oct. 29, 2015; 13 pages.

International Preliminary Report on Patentability for PCT Patent Application No. PCT/US2015/034005, dated Dec. 14, 2017; 9 pages.

Office Action for Canadian Patent Application No. 2979543, dated Jul. 9, 2018; 3 pages.

* cited by examiner

ELECTROCHEMICAL REMOVAL OF METAL OR OTHER MATERIAL FROM POLYCRYSTALLINE DIAMOND

RELATED APPLICATIONS

This application is a U.S. National Stage Application of International Application No. PCT/US2015/034005 filed Jun. 3, 2015, which designates the United States, and is incorporated herein by reference in its entirety.

TECHNICAL FIELD

The present disclosure relates to the electrochemical removal of a metal or other material from polycrystalline diamond (PCD), such as PCD used in earth-boring drill bits.

BACKGROUND

PCD and other superhard materials are well-suited for use in high temperature environments, such as those encountered when drilling wellbores into formations and may be used in cutters or other elements, such as erosion-resistant elements, on earth-boring drill bits. Diamond is extremely thermally conductive, but PCD often contains less conductive materials, such as metals. When the PCD is heated to a high temperature, the diamond conducts and dissipates heat much more readily than do any metals or other less thermally-conductive materials also in the PCD. This leads to a variety of problems that can damage or break the PCD. Accordingly, metals are often removed from all or a portion of the PCD, typically in an acid-leaching process.

Electrochemical processes have also been used to remove metals or other material from PCD. Electrochemical processes use an electrical current to remove electrons from some materials, such as metals found in PCD, to render those materials chemically charged (the materials form ions) and more able to dissolve in water or another liquid or gel and migrate out of the PCD as a result. The electrical current may also encourage the migration of ions out of the PCD. However, the same metals that are removed are also the primary way in which electrical current is conducted in the PCD because diamond is a very poor electrical conductor. The result of this combination of properties is the formation of a metal-free or reduced-metal layer of the PCD, which is not able to conduct an electrical current very well, and which, as a result, interferes with further progress of the electrochemical process.

BRIEF DESCRIPTION OF THE DRAWINGS

For a more complete understanding of the present invention and its features and advantages, reference is now made to the following description, taken in conjunction with the accompanying drawings, which are not drawn to scale, and in which.

DETAILED DESCRIPTIONS

The present disclosure includes systems and methods for electrochemical removal of metal or other material that may become positively charged ions from PCD and PCD elements, such as cutters or erosion-resistant elements for earth-boring drill bits. Although this disclosure focuses on metal as an example, other materials may become positively charged ions in electrochemical processes and, accordingly may be removed from PCD in conjunction with metal, or, if electrically conductive, without reliance upon the presence of metal and even in the absence of metal. If the material to be removed is a metal, it may be a Group VIII metal, such as cobalt (Co), nickel (Ni), or iron (Fe). It may also be a material used to form the PCD or to attach it to a substrate.

In electrochemical cells and electrochemical methods discussed herein, PCD containing metal or other material is included in the anode. The PCD may be conductivity-enhanced PCD, such that it functions better as an anode than conventional PCD. Conductivity-enhanced PCD may have better electrical conductivity than conventional PCD of similar composition either throughout the PCD, in an internal portion of the PCD, or at one or more surfaces. In either case, the electrochemical activity of the PCD is enhanced, allowing for quicker or more thorough electrochemical removal from the PCD of metal or other material, such as catalysts or other ionic materials.

Figure 1A:
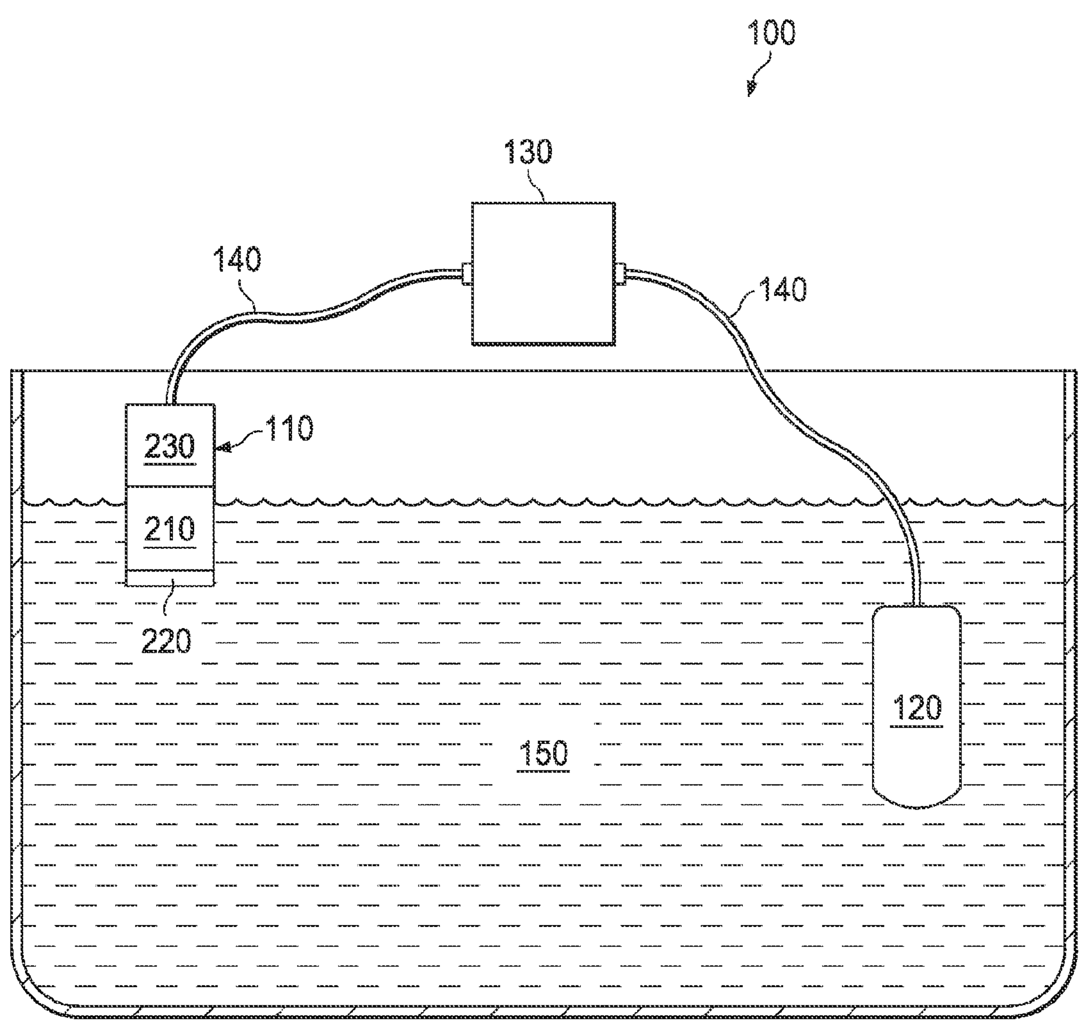
FIG. 1A is a schematic diagram of an electrochemical system using a conductivity-enhanced PCD element with a substrate as an anode.
Figure 1B:
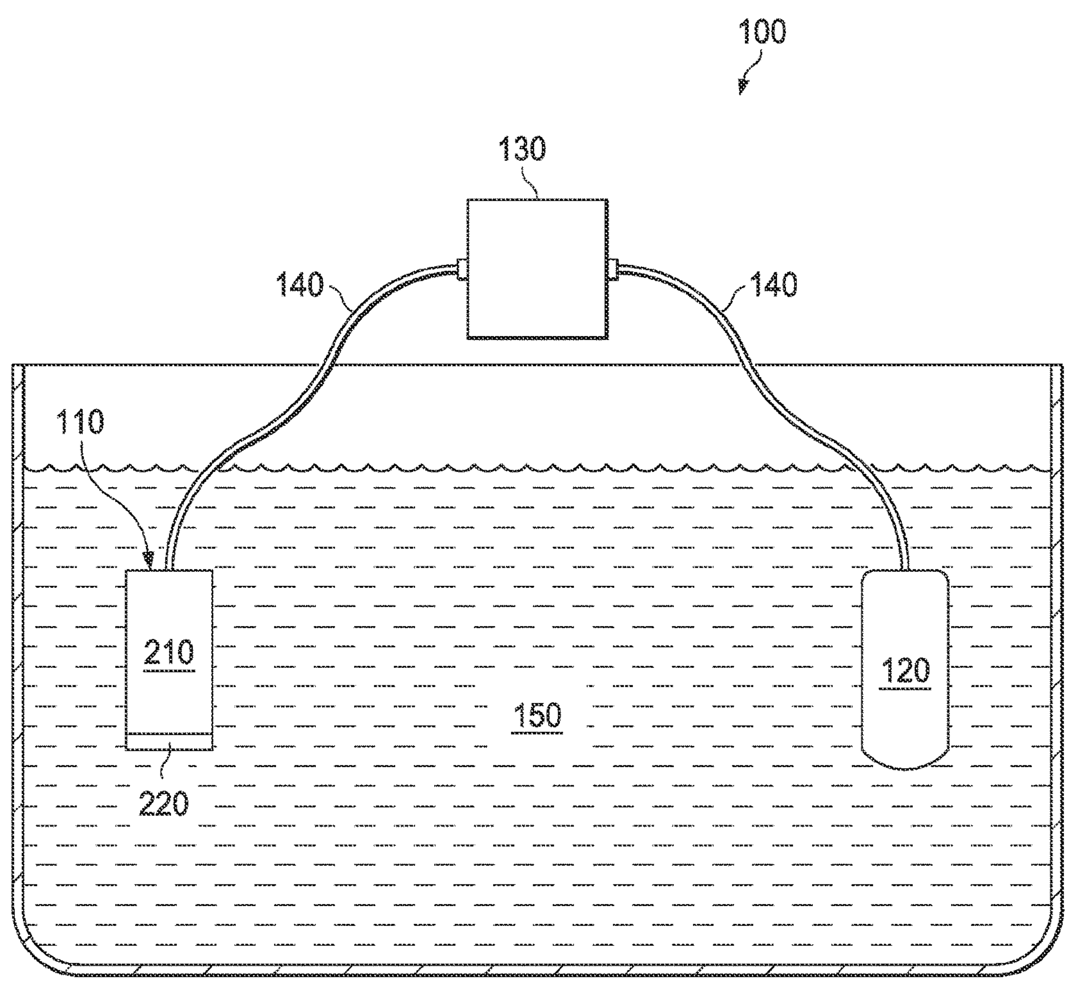
FIG. 1B is a schematic diagram of an electrochemical system using a conductivity-enhanced PCD element without a substrate as an anode.

FIGS. 1A and 1B are schematic diagrams depicting an electrochemical system 100 for removing metal or other material from PCD using an electrochemical process. Anode 110 includes PCD element containing PCD element 200, with non-enhanced portion 210, electrical conductivity-enhanced portion 220, and substrate 230 (FIG. 1A), or without a substrate (FIG. 1B). A suitable cathode material forms cathode 120. Suitable cathode materials include other metals or compounds able to accept electrons and ions of the metal or other material being removed from the PCD. Anode 110 and cathode 120 are electrically connected to voltage source 130 by leads 140. Anode 110 and cathode 120 are not otherwise electrically connected to one another, else a short circuit will occur. Anode 110 and cathode 120 are chemically connected via electrolyte 150, which is selected to accommodate the voltage differential to be applied between the anode and the cathode and to allow ions to exit the anode. Electrolyte 150 may include a liquid or a gel and may often be aqueous or formed from an ionic liquid. Electrolyte 150 typically also contains the ions to be removed from the PCD.

Voltages at which metals and other materials gain or lose electrons are often known and reported against a reference electrode (such as a hydrogen electrode). If not known, they can typically be calculated or measured in a simple experiment by placing the material in an electrochemical cell with a reference electrode. Voltages at which metals or other materials to be removed from the PCD lose electrons may thus be determined. An appropriate cathode material may similarly be determined by finding a material that gains electrons at a voltage compatible with the anode voltage. Voltages at which electrolytes can ions with the anode and the cathode are also often available as reference materials or can be determined experimentally in an electrochemical cell with reference electrodes. In addition, once the relevant anode voltage is known, the cathode material and electrolyte can be selected to, if possible, avoid any hazards, such as the need to operate the electrochemical cell at a high voltage or the use of toxic or flammable electrolytes. The desired amount of time required for material removal, the amount of material to be removed, and other safety considerations may also affect the voltage as well as other electrochemical parameters, such as current. Thus, using the teachings of this disclosure combined with reference materials or the results of simple experiments, one of ordinary skill in the art may readily construct a very large array of electrochemical cells to remove a very wide variety of metals or other materials from PCD.

Substrate 230, if present, may also contain materials that would be removed by the electrochemical process. As a result, as shown in FIG. 1A, substrate 230 may remain out of the electrolyte. Alternatively it may be protected by a non-conductive material (not shown). Although some materials may still migrate out the substrate through the PCD and into the electrolyte, this migration is limited. Some substrates may be sufficiently resistant to material loss through the electrochemical process, for example by using a voltage or electrolyte that does not facilitate removal of materials from the substrate, that they may be immersed in the electrolyte without substantial material loss. For instance, substrate 230 may contain poor electrical conductors and a metal that will not become an ion at the voltage used in the electrochemical cell, or that cannot readily enter the electrolyte.

In embodiments such as those shown in FIG. 1B, where no substrate is present, the PCD may simple be immersed in the electrolyte. This may facilitate removal of the metal or other material from all surfaces of the PCD.

When a metal or other material is removed from PCD anode 110 via an electrochemical process using an apparatus such as that in FIG. 1A or 1B or another electrochemical apparatus, a voltage is applied between PCD anode 110 and cathode 120 using voltage source 130.

Although the present disclosure focuses on material removal at a single voltage with a single electrolyte/anode/cathode combination, it is possible to use multiple voltages or otherwise to vary electrochemical parameters during the electrochemical process. In addition, electrolyte 150 may be replaced, if needed, and different cathodes 120 or electrolytes 150 may be used in a multi-step process. This allows the removal of different materials from the same PCD anode 110.

When a voltage is applied from voltage source 130, electrons flow from the anode to the cathode through an electrical conductor, such as leads 140, connecting the electrodes. In order to balance the overall charge in the electrodes after a loss or gain of electrons, oxygen gas is formed at PCD anode 110, which attracts negative ions. Hydrogen gas is formed at cathode 120, which attracts positive ions, such as metal ions. These ions are thus removed from PCD anode 110 and attracted to cathode 120, although they may actually remain in electrolyte 150 or may react with electrolyte 150, depending on the system used. Furthermore, metal or other material removed from the PCD anode 110 may move from interstitial sites on the interior of PCD anode 110 to the surface, where they may exit PCD anode 110.

In some systems, positive ions, particularly cobalt ions ($Co^{2+}$) (or other Group VIII metal ions, such as iron or nickel ions) may react with hydroxide ($OH^-$) present in electrolyte 150 to form cobalt hydroxide ($Co(OH)_2$) (or a corresponding Group VIII metal oxide) which is not soluble in water and which may form deposits on anode 110 or cathode 120, requiring acid to remove them. This tendency to form deposits often hampers electrochemical system 100 and therefore, cobalt hydroxide ($Co(OH)_2$) formation may be decreased or avoided. One method of decreasing or avoiding cobalt hydroxide ($Co(OH)_2$) formation is to provide another negative ion with which cobalt ions ($Co^{2+}$) may react. Suitable alternative ions include sulfate ($SO_4^{2-}$), chloride ($Cl^-$), and nitrate ($NO_3^-$), and combinations thereof. Cobalt sulfate ($CoSO_4$) has a solubility of 38 g/100 mL in water at 25° C. Cobalt chloride ($CoCl_2$) has a solubility of 53 g/mL in water at 25° C. Cobalt nitrate ($Co(NO_3)_2$) has a solubility of 103.8 g/mL in water at 25° C. Thus, in an aqueous electrolyte solution, these materials form little to no deposits that interfere with electrochemical system function. Similar properties are observed with other metal ion compounds. The inclusion of an acid in electrolyte 150 further helps avoid deposits, even at pH or acid concentrations that are ineffective against interfering with cobalt hydroxide ($Co(OH)_2$) deposits. For example, electrolyte 150 may be formed from diluted nitric acid ($HNO_3$) and iron (III) nitrate ($Fe(NO_3)_3$) that is not sufficient to substantially chemically leach the material to be removed, such as Co, from the PCD in the amount of time the PCD is subjected to the electrochemical process. Other acid-containing electrolytes 150 may further be selected to contain an anionic component that is the same as the anion that reacts with the cobalt ion ($Co^{2+}$) or other metal ion or positive ion to be removed from anode 110.

In order for an electrochemical system, such as system 100, to function, the electrodes are sufficiently electrically conductive to gain or lose electrons, which drives a gain or loss of ions to balance the overall charge in the electrode material. Although PCD anode 110 may still have an overall electrical conductivity, lack of electrical conductivity at its surface nevertheless impedes the electrochemical process because positive ions exit to the electrolyte primarily at the surface. Once the surface has experienced a sufficient decrease in electrical conductivity, even movement of positive ions from electrically conductive portions of the interior of PCD anode 110 to the surface is impeded.

Although there may be various reasons for loss of electrical conductivity at the surface of PCD anode 110, one of the most common is that the very element or compound that provides electrical conductivity, usually a metal, is the same element of compound that forms a positive ion and is removed by the electrochemical process. So, the process tends to inhibit itself by removing from the anode the very material needed for the electrochemical process to continue.

The present disclosure, therefore, also provides PCD anodes 110 with increased electrical conductivity at their surface. Even if this electrical conductivity is decreased during an electrochemical process, for example because the material that provides electrical conductivity is still the material being removed, it still remains sufficient for the desired amount of metal or other material to be removed from the desired portions of PCD component using an electrochemical process.

PCD anode 110 may provide a consistent current and ion flow between PCD anode 110 and cathode 120. Consistent current and ion flow may allow quick or consistent removal of metal or other material from internal interstitial sites within PCD anode 110.

In embodiments where electrolyte 150 reacts with the metal or other material removed from PCD anode 110, PCD anode 110 may further help provide sufficient reactive electrolyte ion near the surface of PCD anode 110. It may also facilitate quick or consistent removal of reacted metal or other material from the surface of PCD anode 110 or from interstitial sites.

Electrolyte 150 may contain an element that has a catalytic effect on removal of the metal or other material. In one example in which cobalt (Co) is removed, the electrolyte may contain iron (Fe), which has such a catalytic effect. In addition to containing a catalytic material in electrolyte 150, during use of such a system, the voltage potential/polarity between anode 110 and cathode 120 may be reversed at least once or periodically alternated to drive the catalytic into the interior of PCD anode 110, such as interstitial sites, where it may further enhance the metal or other material removal reaction.

The effectiveness of metal or other material removal can be measured at the end of the electrochemical process or at any point during the process using conventional techniques. If non-destructive techniques are used, then PCD anode 110 may be returned to the process. For example, scanning electron microscopy, with or without elemental detection, or optical microscopy may be used. If the metal or other material to be removed is electrically conductive, the remaining amount may also be measured by measuring electrical conductivity of PCD anode 110. In addition, X-ray diffraction (XRD) of a sample of PCD anode 110 may be used to analyse it chemical composition, particularly if few crystalline species other than diamond and metal are present.

Although in some instances substantially all of the metal or other material may be removed from the PCD component of anode 110, in other instances only at least 80%, at least 95%, or at least 99% may be removed.

Although FIGS. 1A and 1B depict a single anode/single cathode system, systems containing multiple anode or cathodes may be used, for example to obtain batch processing of multiple PCD elements. Furthermore, although FIGS. 1A and 1B depict a static system, systems in which electrolyte 150 is continuously replenished are included in this disclosure.

Figure 2A:
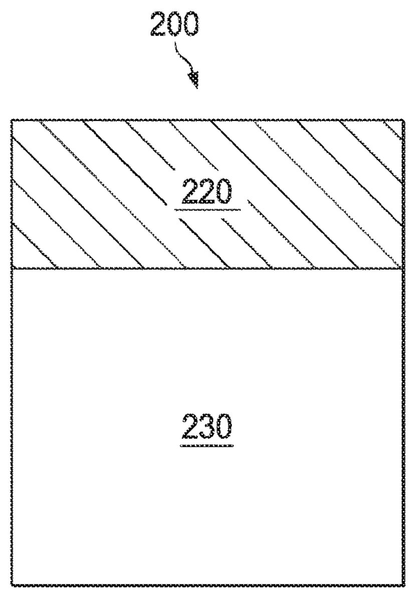
FIG. 2A is a schematic diagram of a cross-section of a conductivity-enhanced PCD element in which the entire PCD component is electrical conductivity-enhanced.
Figure 2B:
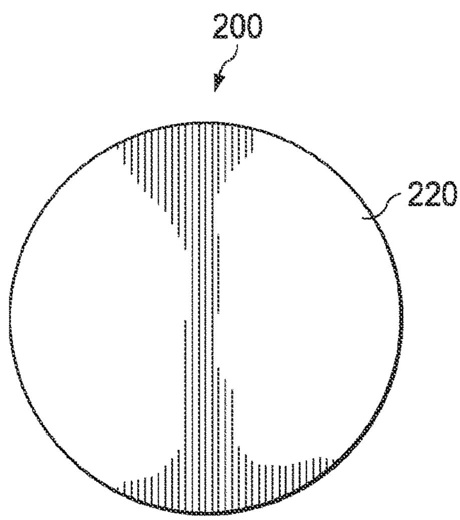
FIG. 2B is a schematic diagram of a top view of the PCD element of FIG. 2A.

FIG. 2A is a schematic diagram of a cross-section of an electrical conductivity-enhanced PCD element 200 in which the entire PCD component is electrical conductivity-enhanced PCD 220. FIG. 2B is a schematic diagram of a top view of the PCD element of FIG. 2A. If the material to be electrochemically removed is the same as the material providing the enhancement of electrical conductivity, this configuration may experience problems with surface material depletion similar to those experienced by non-enhanced PCD. Accordingly, although this configuration may be easy to form, it may be used most commonly when the material providing the enhancement of electrical conductivity is not the same as the material to be electrochemically removed.

Figure 3:
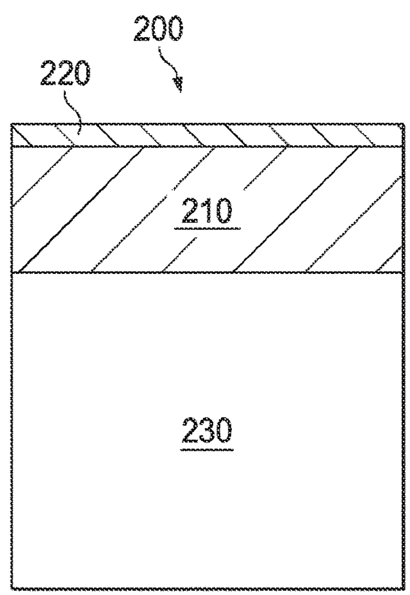
FIG. 3 is a schematic diagram of a cross-section of a conductivity-enhanced PCD element with an electrical conductivity-enhanced top surface.

FIG. 3 is a schematic diagram of a cross-section of a conductivity-enhanced PCD element 200 with electrical conductivity-enhanced PCD 220 located at the top surface, above non-enhanced PCD 210, which is mounted on substrate 230. Electrical conductivity-enhanced PCD 220 exhibits increased electrical conductivity as compared to non-enhanced PCD 210. Although FIG. 3 illustrates a PCD element 200 in which the entire top surface is formed from electrical conductivity-enhanced PCD 220, embodiments in which only a portion of the top surface is enhanced are possible. When the material to be electrochemically removed is the same as the material providing enhanced electrical conductivity, this configuration may be particularly advantageous. In addition, because electrical conductivity is enhanced on only one surface, this configuration may be particularly easy to form as compared to other configurations presented herein.

Figure 4:
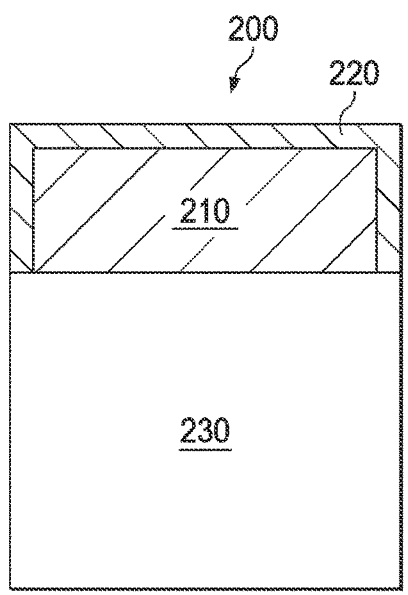
FIG. 4 is a schematic diagram of a cross-section of a conductivity-enhanced PCD element with an electrical conductivity-enhanced top surface and side surface.

FIG. 4 is a schematic diagram of a cross-section of a conductivity-enhanced PCD element 200 with electrical conductivity-enhanced PCD 220 located at the top surface and side surface, above and around non-enhanced PCD 210, which is mounted on substrate 230. Although FIG. 4 illustrates a PCD element 200 in which the entire top surface and side surface are formed from electrical conductivity-enhanced PCD 220, embodiments in which only a portion of the top surface and/or side surface is enhanced are possible. When the material to be electrochemically removed is the same as the material providing enhanced electrical conductivity, this configuration may be particularly advantageous.

Figure 5:
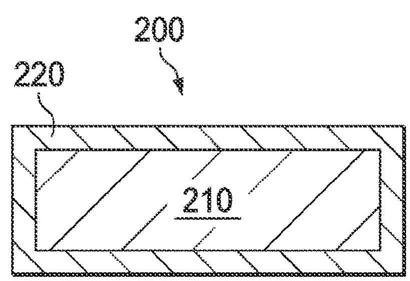
FIG. 5 is a schematic diagram of a cross-section of a conductivity-enhanced PCD element without a substrate with an electrical conductivity-enhanced top surface, side surface, and bottom surface.

FIG. 5 is a schematic diagram of a cross-section of a conductivity-enhanced PCD element 200 with electrical conductivity-enhanced PCD 220 located at the top surface, side surface, and bottom surface around non-enhanced PCD 210. This PCD element 200 lacks a substrate and may be particularly well-suited for use with PCD not attached to a substrate. This configuration may be particularly useful to achieve electrochemical removal for all or nearly all of PCD element 200. Although FIG. 5 illustrates a PCD element 200 in which the entire top surface, side surface, and bottom surface are formed from electrical conductivity-enhanced PCD 220, embodiments in which only a portion of the top surface, side surface and/or bottom surface is enhanced are possible. When the material to be electrochemically removed is the same as the material providing enhanced electrical conductivity, this configuration may be particularly advantageous.

Figure 6A:
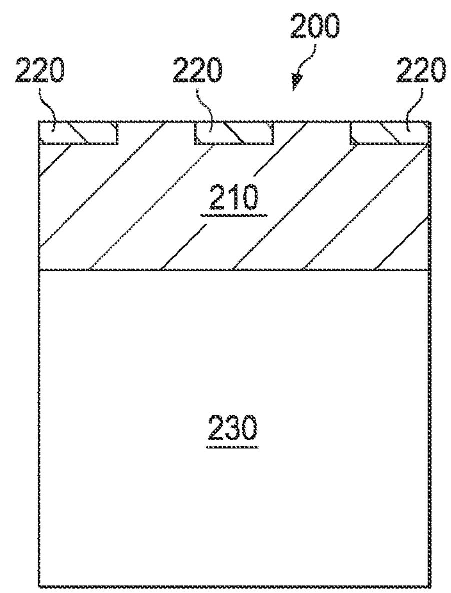
FIG. 6A is a schematic diagram of a cross-section of a conductivity-enhanced PCD element with a partially conductivity-enhanced top surface and side surface.
Figure 6B:
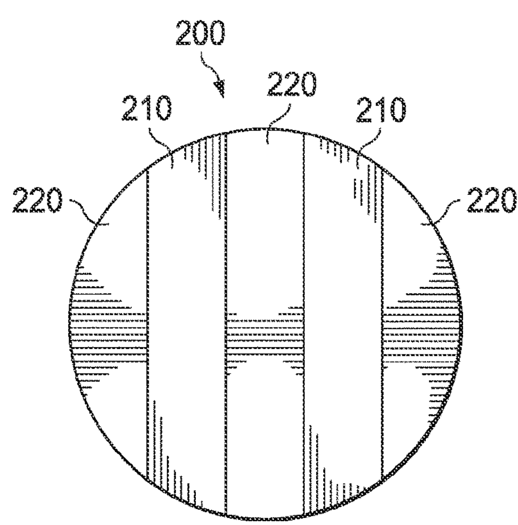
FIG. 6B is a schematic diagram of a top view of the PCD element of FIG. 7A.

FIG. 6A is a schematic diagram of a cross-section of a conductivity-enhanced PCD element 200 with a top surface and side surface partially formed from conductivity-enhanced PCD 220, and partially formed from non-enhanced PCD 210. The PCD component is mounted on substrate 230. FIG. 6B is a schematic diagram of a top view of PCD element 200 of FIG. 6A. A representative placement pattern is shown, but other patterns, such as concentric ones, may be used. Patterns may be used to control the degree of electrochemical removal in portions of the PCD component of PCD element 200, for example to provide a final PCD element with different properties in different portions of the PCD component.

In addition, the location of electrical conductivity-enhanced PCD, such as PCD 220 and the proportion of the surface of a PCD element, such as PCD element 200, that it occupies may be selected based on a variety of considerations, such as the amount of metal or other material to be electrochemically removed from the PCD element, whether the metal or other material is the same or different from the material that enhances electrical conductivity, whether a substrate will be present during the electrochemical process, the electrical conductivity needs of the electrochemical process, and the amount of metal or other material that may tolerably remain in the PCD component of the PCD element or a portion thereof after the electrochemical process.

Figure 7:
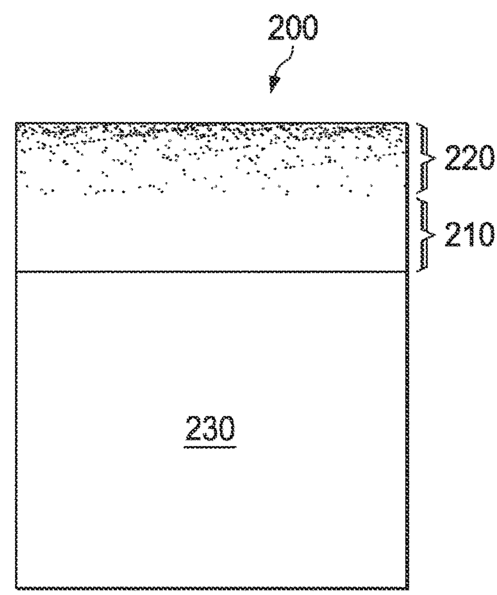
FIG. 7 is a schematic diagram of a cross-section of a conductivity-enhanced PCD element with a conductivity-enhanced gradient at the top surface.

Electrical conductivity-enhanced PCD, such as PCD 220, may contain as substantially uniform distribution of the material that enhances electrical conductivity. However, non-uniform distributions are possible. For instance, in FIG. 7, which is a schematic diagram of a cross-section of a PCD element 200, the material that enhances electrical conductivity in PCD 220 is present in a gradient that decreases in concentration from the top surface of PCD element 200. Similar gradients may be employed with respect to other configurations.

Although, for illustrative purposes, electrical conductivity-enhanced PCD 220 is depicted herein as extending a substantial distance from corresponding surfaces, it may extend only a short distance from a corresponding surface, such as one diamond grain or less, two diamond grains or less, four diamond grains, or less, 50 μm or less, or 100 μm or less. In addition, electrical conductivity-enhanced PCD 220 may include PCD that is otherwise indistinguishable from non-enhanced PCD 210 except for a coating present on electrical conductivity-enhanced PCD, which coating may not extend substantially below the surface of the PCD at all.

Electrical conductivity-enhanced PCD 220 may be formed using a variety of methods that provide a material able to enhance electrical conductivity to that PCD. For instance a hydrogen or fluorine plasma may be applied to the surface or a portion of the surface of PCD element 200. This converts diamond surface sp3 bonds to carbon (C) dangling bonds to which hydrogen (H) or fluorine (F) attach, which creates a p-type surface electrical conductivity. In addition, this type of electrical conductivity is increased in water, making it particularly well-suited for an electrochemical removal process using an aqueous electrolyte. Furthermore, because hydrogen (H) and fluorine (F) are not the materials removed from PCD element 200 by the electrochemical process, this type of conductivity does not inhibit itself as the electrochemical process advances, readily allowing all or substantially all of the metal or other material to be removed from the PCD component of PCD element 200 or any portion thereof.

Electrical conductivity-enhanced PCD 220 may also be formed by using a high-temperature annealing process to attach hydrogen (H) or fluorine (F) to the surface of PCD element 200. In this process, PCD element 200 is exposed to hydrogen (H) or fluorine (F) gas at temperature above 700° C. Pressure may be atmospheric pressure or an elevated pressure. The gas may be flowed past PCD element 200 to ensure adequate supply.

In the plasma or high-temperature annealing processes or any other thermal process, temperature may be controlled to avoid graphitization of diamond. For instance, it may remain at 850° C. or less, 1000° C. or less, or 1100° C. or less.

Other methods of attaching hydrogen (H) or fluorine (F) or similar elements or compounds able to create a p-type surface conductivity may also be used. The end result is a PCD element 200 that with p-type surface conductivity in electrical conductivity-enhanced PCD 220. This p-type surface conductivity is typically provided by hydrogen (H) or fluorine (F) bound to the surface of PCD element 200 via a carbon (C) atom.

Combinations of hydrogen (H), fluorine (F), and other suitable materials may be used.

Electrical conductivity-enhanced PCD 220 may also be formed by doping the PCD with an agent able to enhance its electrical conductivity, such as boron (B), aluminum (Al), or phosphorus (P). These doping agents may be included when PCD element 200 is formed, or added after formation.

For instance, boron (B), aluminum (Al), or phosphorus (P) may be implanted in electrical conductivity-enhanced PCD 220 using high dose ion implantation, in which ions to be implanted are propelled by an electrical field until they impact the implanted surface. In this method, the depth from the surface to which ions are implanted is determined by the energy applied by the electrical field. More energy results in greater implantation depth.

Boron (B), aluminum (Al), phosphorus (P), and also lithium (Li) may also be added to the diamond grains in the location to form electrical conductivity-enhanced PCD 220 prior to formation of PCD element 200 using a high pressure high temperature (HPHT) process. Li may be a PCD formation catalyst as well and may remain in the PCD after the electrochemical process. Other PCD catalysts with this property may also be used.

Combinations of boron (B), aluminum (Al), phosphorus (P), lithium (Li) and other PCD formation catalysts that may remain in the PCD after the electrochemical process, along with other suitable materials may be used.

PCD elements obtained using the system and method described herein may be used in a variety of applications, such as cutters and erosion-resistance elements on earth-boring drill bits.

In an embodiment A, the disclosure provides a system for electrochemically removing a metal or other material from a PCD element. The system may include an anode containing the PCD element. The PCD element may contain a PCD component that further includes the metal or other material and an electrical conductivity-enhanced portion. The system may also include a cathode, an electrolyte, and a voltage source. When a voltage is applied to the anode and the cathode by the voltage source, the metal or other material forms a positive ion and is removed from the PCD component to the electrolyte.

In an embodiment B, the disclosure provides a method of removing a metal or positive ion from a PCD element by forming an electrical-conductivity enhanced portion of a PCD component of the PCD element and conducting an electrochemical process using the PCD element in an anode. During the electrochemical process, a voltage is applied between the anode and a cathode such that the metal or other material forms a positive ion and is removed from the PCD component by an electrolyte.

System A and method B may be used in combination with one another or in combination with any of the following additional elements, which may further be combined with one another unless clearly mutually exclusive: i) the metal may include a Group VIII metal; ii) the metal may include cobalt; iii) the electrical conductivity-enhanced portion of the PCD component may include at least a portion of a surface of the PCD component; iv) the electrical conductivity-enhanced portion of the PCD component may include at least a portion of a top surface of the PCD component; v) the electrical conductivity-enhanced portion of the PCD component may include at least a portion of a side surface of the PCD component; vi) the electrical conductivity-enhanced portion of the PCD component may include at least a portion of a top surface, at least a portion of a side surface, and at least a portion of a bottom surface of the PCD component; vii) the electrical conductivity-enhanced portion may include substantially all of the PCD component; viii) the electrolyte is an aqueous electrolyte including sulfate ($SO_4^{2-}$), chloride ($Cl^-$), or nitrate ($NO_3^-$), or combinations thereof, ix) the metal may include cobalt (Co) and the electrolyte may include iron (Fe); x) at least two metals or other materials may form positive ions and be removed from the PCD component to the electrolyte; xi) the electrical conductivity-enhanced region may include hydrogen (H) or flourine (F) or combinations thereof bonded to carbon (C) on a surface of the PCD element, and the electrical conductivity may be p type; xii) the hydrogen (H) or fluorine (F) or combinations thereof may be plasma-deposited; xiii) the hydrogen (H) or fluorine (F) or combinations thereof may be deposited using a high-temperature annealing process; xiv) the electrical conductivity-enhanced region may include boron (B), aluminum (Al), phosphorus (P), or lithium (Li) or combinations thereof as doping agent, and the electrical conductivity may result from doping; xv) the boron (B), aluminum (Al), or phosphorus (P), or combinations thereof may be implanted in a surface of the PCD component using high dose ion implantation; xvi) the boron (B), aluminum (Al), phosphorus (P), or lithium (Li) or combinations thereof may bed added to diamond grains contained in the PCD component before formation of the PCD component; xvii) forming an electrical conductivity-enhanced portion of the PCD component may include bonding hydrogen (H) or fluorine (F), or a combination thereof to carbon (C) at a surface of the PCD element to increase p type conductivity; xviii) forming an electrical conductivity-enhanced portion of the PCD component may include doping the PCD component with boron (B), aluminum (Al), phosphorus (P), or lithium (Li), or a combination thereof.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. For instance, PCD as described herein may include PCD formed from diamond grains with more than one grain size. Doping agents may also have more than one size. In addition, although the present specification focuses on PCD, it will be appreciated that the systems and methods described herein may be usable with other superhard materials as well.

What is claimed is:

1. A system for electrochemically removing a metal from a PCD element, the system comprising:

an anode comprising the PCD element, wherein the PCD element comprises a PCD component comprising a non-enhanced PCD portion comprising the metal, and an electrical conductivity-enhanced PCD portion;

a cathode;

an electrolyte; and a voltage source, wherein, when a voltage is applied to the anode and the cathode by the voltage source, the metal forms a positive ion and is removed from the PCD component to the electrolyte.

2. The system of claim 1, wherein the metal comprises a Group VIII metal.

3. The system of claim 2, wherein the Group VIII metal comprises cobalt (Co).

4. The system of claim 1, wherein the electrical conductivity-enhanced PCD portion comprises at least a portion of a surface of the PCD component.

5. The system of claim 4, wherein the electrical conductivity-enhanced PCD portion comprises at least a portion of a top surface of the PCD component.

6. The system of claim 5, wherein the electrical conductivity-enhanced PCD portion comprises at least a portion of a side surface of the PCD component.

7. The system of claim 5, wherein the electrical conductivity-enhanced PCD portion comprises at least a portion of a top surface, at least a portion of a side surface, and at least a portion of a bottom surface of the PCD component.

8. The system of claim 1, wherein the electrolyte is an aqueous electrolyte comprising sulfate ($SO_4^{2-}$), chloride ($Cl^-$), or nitrate ($NO_3^-$), or combinations thereof.

9. The system of claim 1, wherein the metal comprises cobalt (Co) and the electrolyte comprises iron (Fe).

10. The system of claim 1, wherein at least two metals form positive ions and are removed from the PCD component to the electrolyte.

11. The system of claim 1, wherein the electrical conductivity-enhanced PCD portion comprises hydrogen (H) or fluorine (F) or combinations thereof bonded to carbon (C) on a surface of the PCD element.

12. The system of claim 11, wherein the hydrogen (H) or fluorine (F) or combinations thereof are plasma-deposited.

13. The system of claim 11, wherein the hydrogen (H) or fluorine (F) or combinations thereof are deposited using a high-temperature annealing process.

14. The system of claim 1, wherein the electrical conductivity-enhanced PCD portion comprises boron (B), aluminum (Al), phosphorus (P), or lithium (Li) or combinations thereof as doping agent, and wherein the electrical conductivity results from doping.

15. The system of claim 14, wherein the boron (B), aluminum (Al), or phosphorus (P), or combinations thereof are implanted in a surface of the PCD component using high dose ion implantation.

16. The system of claim 14, wherein the boron (B), aluminum (Al), phosphorus (P), or lithium (Li) or combinations thereof are added to diamond grains contained in the PCD component before formation of the PCD component.

17. A method of removing a metal from a PCD element comprising:

forming an electrical-conductivity enhanced PCD portion of a PCD component of the PCD element; and conducting an electrochemical process using the PCD element in an anode, wherein, during the electrochemical process, a voltage is applied between the anode and a cathode such that the metal forms a positive ion and is removed from the PCD component by an electrolyte.

18. The method of claim 17, wherein forming an electrical conductivity-enhanced PCD portion of the PCD component comprises bonding hydrogen (H) or fluorine (F), or a combination thereof to carbon (C) at a surface of the PCD element.

19. The method of claim 17, wherein forming an electrical conductivity-enhanced PCD portion of the PCD component comprises doping the PCD component with boron (B), aluminum (Al), phosphorus (P), or lithium (Li), or a combination thereof.

* * * * *